(12) United States Patent
Liao

(10) Patent No.: US 6,192,773 B1
(45) Date of Patent: Feb. 27, 2001

(54) STEM FOR A BICYCLE

(75) Inventor: Jim Liao, Hsin Chu Hsien (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 09/295,862

(22) Filed: Apr. 21, 1999

(51) Int. Cl.[7] .......................... B62K 21/16; B62K 21/22
(52) U.S. Cl. ..................... 74/551.3; 280/279; 403/101; 403/110
(58) Field of Search .................... 74/551.3; 280/279; 403/93, 100, 101, 110

(56) References Cited

U.S. PATENT DOCUMENTS

| | | |
|---|---|---|
| 657,290 | 9/1900 | Landis . |
| 908,177 | 12/1908 | Watters . |
| 921,457 | 5/1909 | Purdum . |
| 3,361,445 | 1/1968 | Hussey et al. . |
| 3,388,612 | 6/1968 | Oakley et al. . |
| 4,688,817 | * 8/1987 | Marier .................................. 280/278 |
| 5,327,798 | 7/1994 | Lerch, Jr. . |
| 5,515,744 | 5/1996 | Liao . |

FOREIGN PATENT DOCUMENTS

| | | |
|---|---|---|
| 253155 | 11/1948 | (FR) . |
| 1108558 | 10/1955 | (FR) . |

\* cited by examiner

*Primary Examiner*—Allan D. Herrmann
(74) *Attorney, Agent, or Firm*—Andrus, Sceales, Starke & Sawall, LLP

(57) ABSTRACT

An improved stem for a bicycle comprises a pivot member having a lateral member and a locking member attached to the underside of the lateral member, wherein the pivot member has two free ends each having a pivot portion and the locking member has two free ends as well; a column member having a first connecting mechanism at the top thereof for pivotally connecting to the pivot portion; and a sleeve member securing a handlebar, and being provided with a second connecting mechanism at the free end thereof for pivotally connecting the other pivot portion of the pivot member, whereby the locking member can be operated to move so that each free end thereof is fixedly attached to or detached from the first connecting mechanism and the second connecting mechanism so as to achieve the adjustment of the angle between the column member and the pivot member, and the angle of the handlebar, at the same time.

8 Claims, 6 Drawing Sheets

STEM FOR A BICYCLE

FIELD OF THE INVENTION

The present invention relates to an improved stem, and more particularly, to an improved stem for a bicycle which provides easy and convenient angle adjustment of the stem and the handlebar at the same time.

BACKGROUND OF THE INVENTION

FIGS. 1 and 2 show a conventional stem for a bicycle which comprises a column member 1 inserted and fixed into the front fork (not shown) and a lateral member 2 pivotally connected to the top of the column member 1 in the manner that the teeth portion 3 at the top of the column 1 is engaged with the teeth portion 4 at the end portion 5 of the lateral member 2 and that a first bolt 6 passes through the hole 7 at the center of the teeth portion 4 of the lateral member 2 and is tightly screwed into the threaded bore 8 at the center of the teeth portion 3 of the column member 1. The angle between the column member 1 and the lateral member 2 can be adjusted by loosening the first bolt 6. However, once the angle is adjusted, the handlebar 9 should consequently be rotatably adjusted by loosening a second bolt 10 so that the gripping portion at free end of the handlebar 9 is comfortably held by a user at an optimal angle and so that the brake lever (not shown) is adjusted to the desired position. Thus, such angle adjustments which involve operating the first and second bolts 6, 10, respectively, are quite troublesome.

SUMMARY OF THE INVENTION

To overcome the drawback of the conventional stem, an object of the present invention is to provide an improved stem which provides easy and convenient angle adjustment of the stem and the handlebar of a bicycle.

To achieve the objects mentioned above, the present invention provides an improved stem for a bicycle, said stem being adapted for fixing a handlebar, comprises:

a pivot member having a lateral member and a locking member attached to the underside of the lateral member, wherein the pivot member has two free ends each having a pivot portion and the locking member has two free ends as well;

a column member having a first connecting mechanism at the top thereof for pivotally connecting to the pivot portion; and a sleeve member securing the handlebar, and being provided with a second connecting mechanism at the free end thereof for pivotally connecting the other pivot portion of the pivot member, whereby the locking member can be operated to move so that each free end thereof is fixedly attached to or detached from the first connecting mechanism and the second connecting mechanism so as to achieve the adjustment of the angle between the column member and the pivot member, and the angle of the handlebar, at the same time.

BRIEF DESCRIPTION OF THE DRAWING

The above objects and advantages of the present invention will become more apparent by the following detailed description of a preferred embodiment thereof with reference to attached drawings in which.

DETAILED DESCRIPTION OF THE PREFERRED EMBODIMENT

Figure 1:
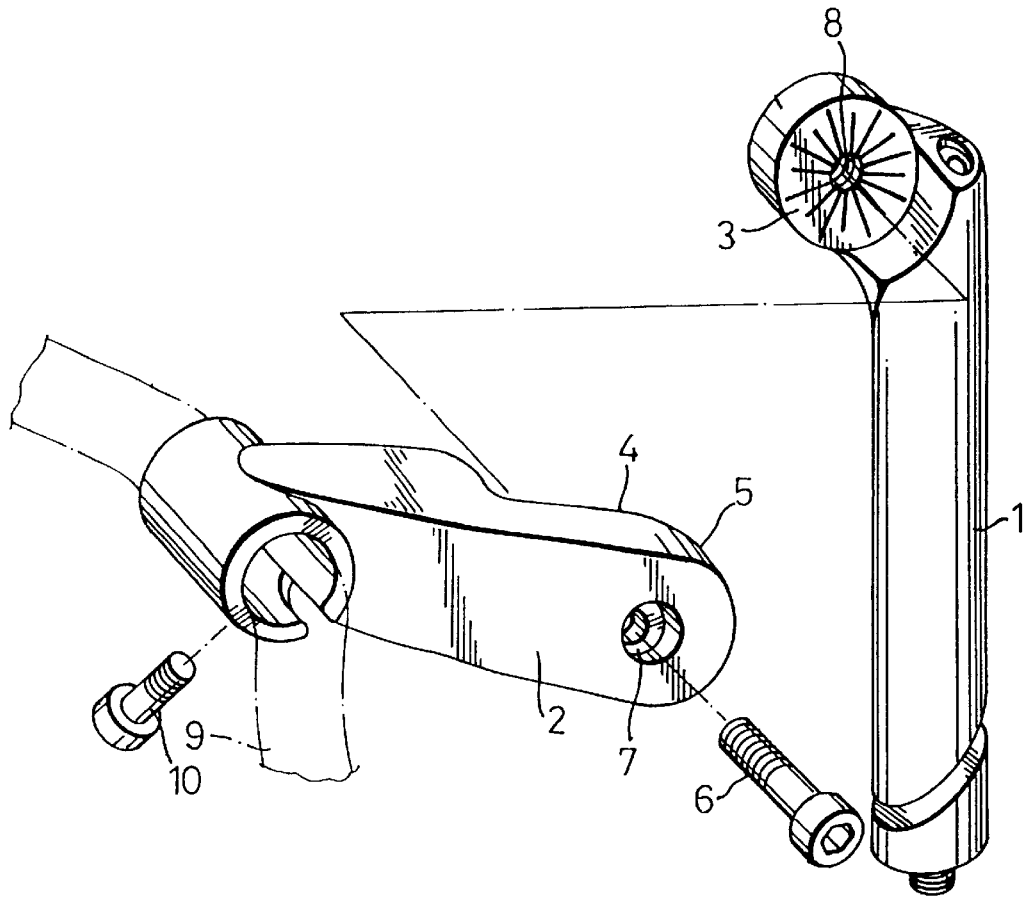
FIG. 1 is an exploded perspective view of a conventional stem for a bicycle.
Figure 2:
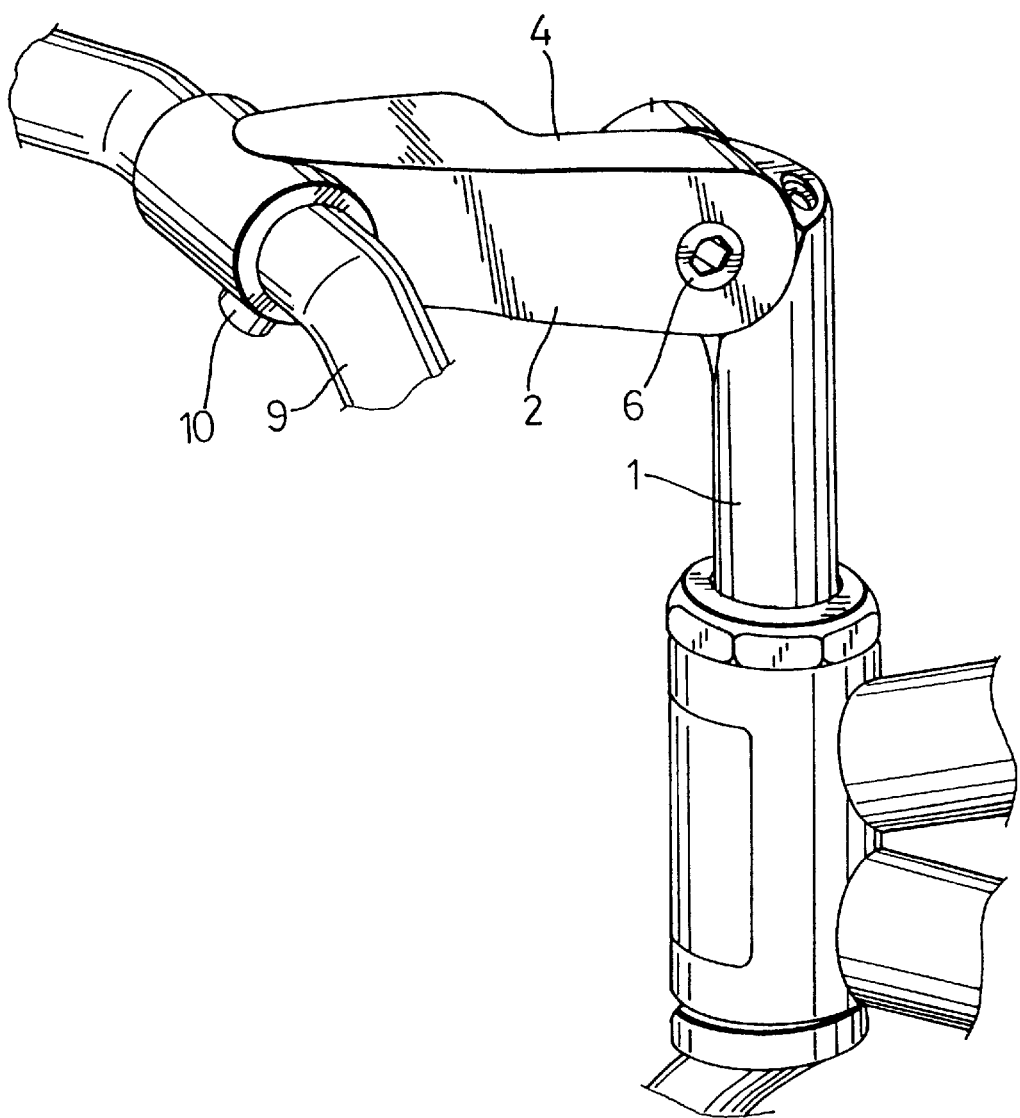
FIG. 2 is a perspective view of a conventional stem for a bicycle in assembled form.
Figure 3:
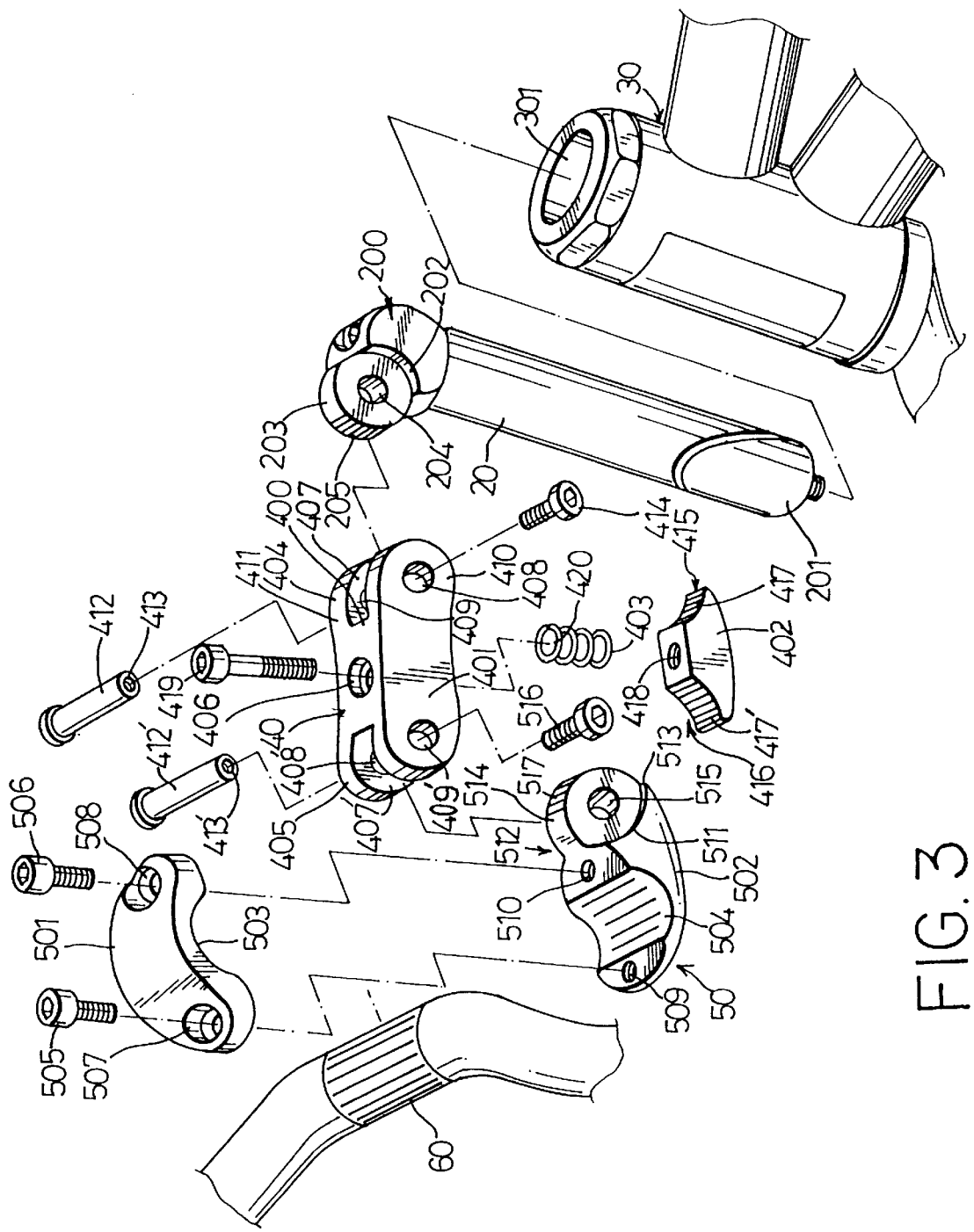
FIG. 3 is an exploded perspective view of an improved stem according to the present invention.
Figure 4:
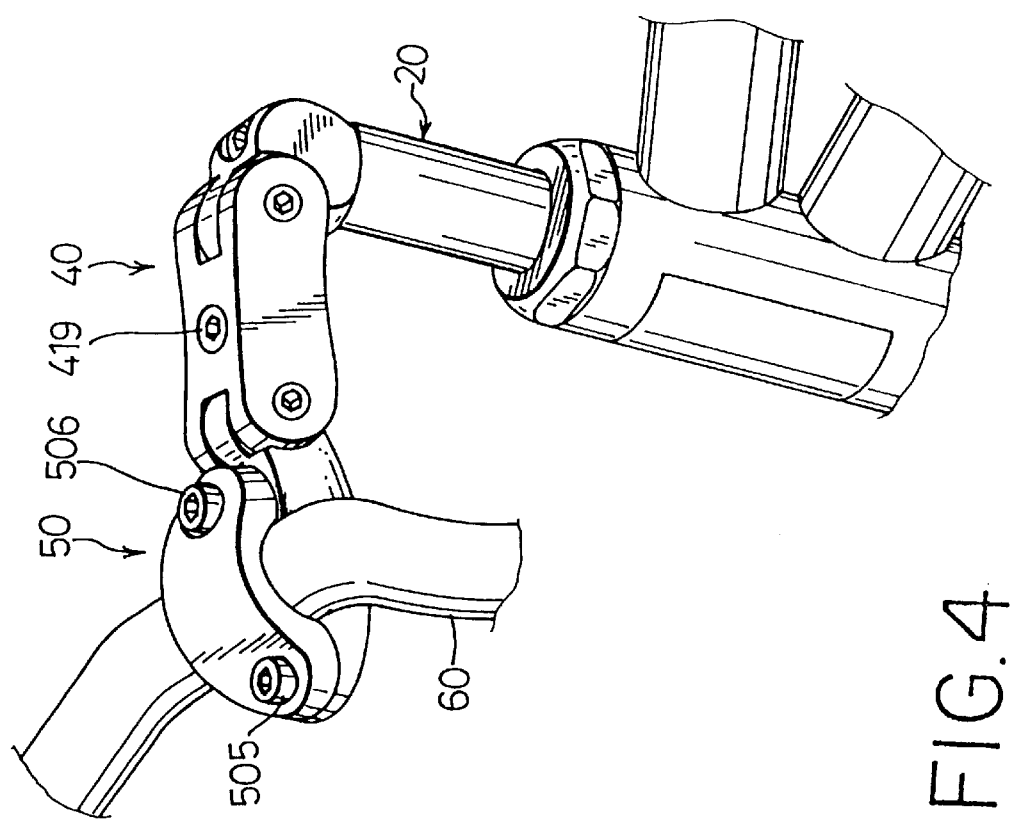
FIG. 4 is a perspective view of an improved stem according to the present invention in assembled form.

Referring now to FIGS. 3 and 4, the improved stem for a bicycle according to present invention comprises a column member 20 having a lower portion 201 for fixedly inserting into the hole 301 of the forked tube 30, a pivot member 40, a sleeve member 50 and a handlebar 60.

The column member 20 has a first connecting mechanism 200 on the top thereof which comprises a first arcuate area 202 and a first annular protruding member 203 having a first laterally central hole 204, and a plurality of first teeth 205 on the surface thereof, wherein the first annular protruding member 203 is disposed in the first arcuate area 202.

The pivot member 40 comprises a lateral member 401, a locking member 402 and a spring 403. The pivot member 40 has two free ends, one of which defines a pivot portion 404 and the other defines a pivot portion 405, the pivot portion 404 being identical to the pivot portion 405 in terms of structure and configuration. A through bore 406 is provided at the center of the lateral member 40. The pivot portion 404 comprises a U-shaped slot 407 defined by two walls 410,411 and a base wall 400, wherein the wall 410 has a hole 408 and the wall 411 has a hole 409, and the two holes 408,409 being aligned with each other. When the first annular protruding member 203 is disposed within the slot 407, a rod 412 having a threaded bore 413 is provided to pass through the hole 409, the central hole 204 and the hole 408 in that order. A screw 414 is screwed into the threaded bore 413 so that the lateral member 401 pivots along the first annular protruding member 203 around the rod 412. In addition, the locking member 402 has two free ends, one of which defines an arcuate area 415 and the other defines an arcuate area 416, the two arcuate areas 415,416 having the same configuration. The two arcuate areas 415,416 are each provided with a plurality of teeth 417 (417) on the surface thereof. The locking member 402 further has a threaded bore 418 at the center thereof. When the locking member 402 is disposed on the underside of the lateral member 401 and the spring 403 is sandwiched between the through bore 406 and the threaded bore 418, a bolt 419 is passed through the through bore 406 and the channel 420 of the spring 403, and is screwed into the threaded bore 418 so that the locking member 402 is attached to the underside of the lateral member 401.

The sleeve member 50 is constituted by an upper block 501 and a lower block 502 each having a semi-circular recess 503(504). When the upper block 501 and the lower block 502 are assembled together, the handlebar 60 can be tightly clamped via the two semi-circular recesses 503,504 by means of two screws 505,506 passing through the apertures 507,508, respectively of the upper block 501 and screwed into the threaded opening 509,510, respectively of the lower block 502. Most notably, the free end 511 of the lower block 502 is provided with a second connecting mechanism 512 identical to the first connecting mechanism 200 in terms of the configuration and structure. That is to say, the second connection mechanism 512 comprises a second arcuate area 513, and a second annular protruding member 514 having a second laterally central hole 515 and a plurality of second teeth 517 on the surface thereof, wherein the second annular protruding member 514 is disposed in the second arcuate area 513. Likewise, when the second annular protruding member 514 is placed within the slot 407 at the pivot portion 405, a rod 41Z having a threaded bore 413 is provided to pass through the hole 408, the central hole 515 and the hole 409 in that order. A screw 516 is subsequently screwed into the inner threaded bore 413 so that the lateral member 401 can pivot along the second annular protruding member 514 around the rod 41Z.

Figure 5:
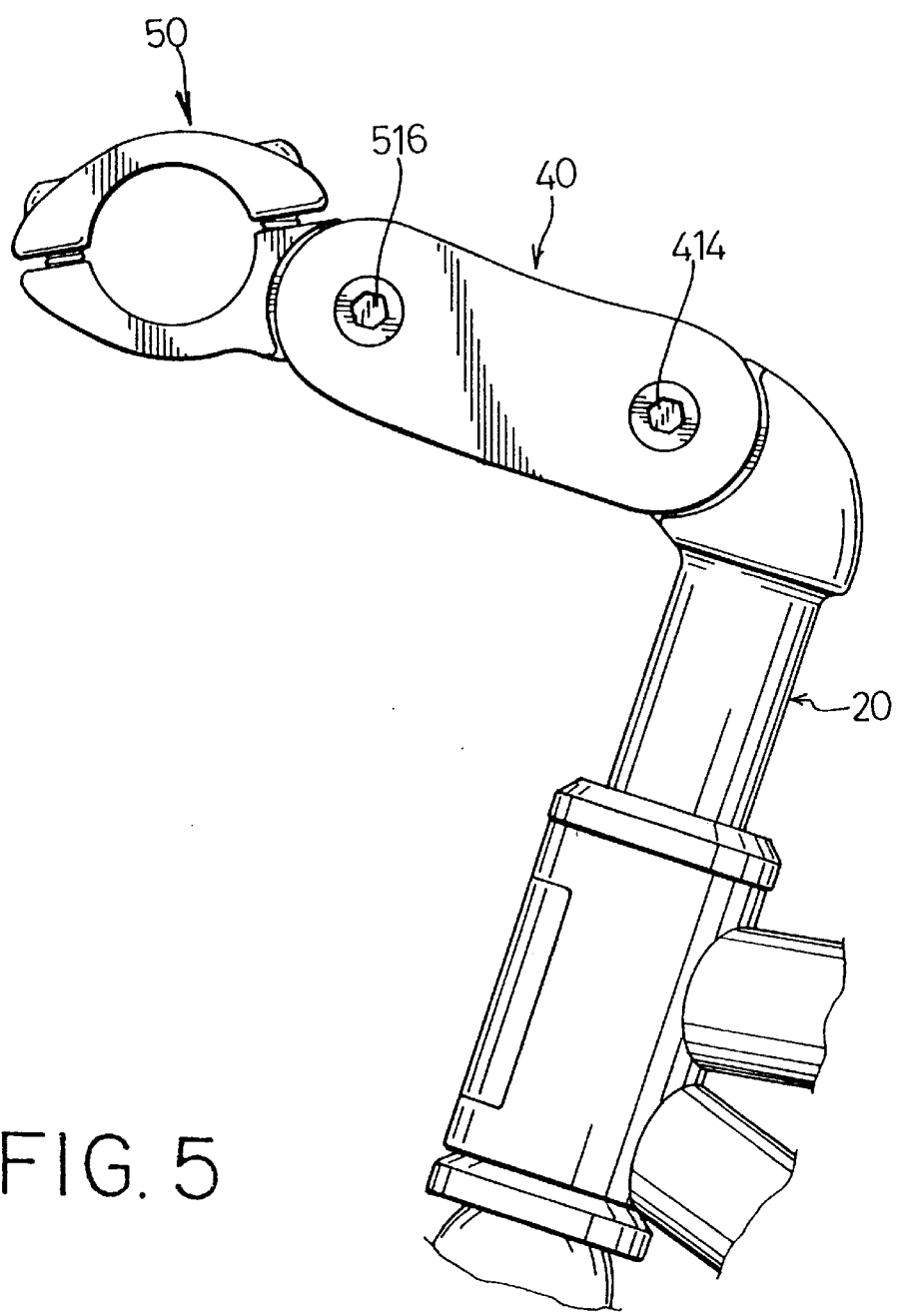
FIG. 5 is a side view of an improved stem according to the present invention in assembled form.
Figure 6:
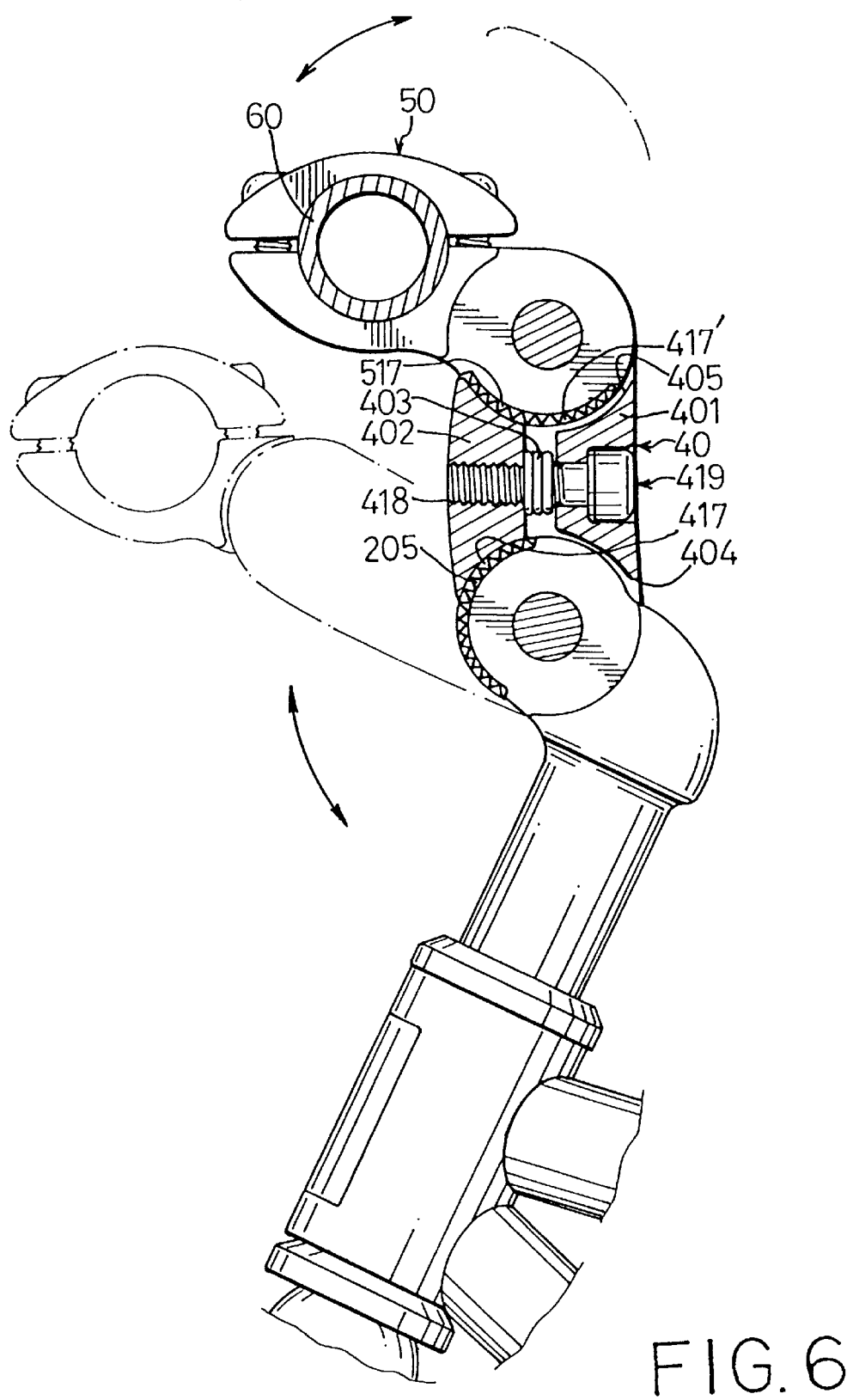
FIG. 6 is a cross-sectional view of an improved stem according to the present invention showing the adjustment of the lateral member and the handlebar to a different angle.

The angle adjustment operation will now be described with reference to FIGS. 5 and 6. When the bolt 419 is tightly screwed into the threaded bore 418, the locking member 402 is moved toward the right, and the teeth 417,417 are securely engaged with the first teeth 205 and the second teeth 517, respectively. Therefore, the pivot portion 404 of the pivot member 40 is fixedly attached to the top of the column member 20 while the sleeve member 50 is fixedly attached to the pivot portion 405 of the pivot member 40. Consequently, by loosening the bolt 419, the restoring force of the spring, which is compressed between the lateral member 401 and the locking member 402, forces the locking member 402 to move toward the left so that the teeth 417,417 are not engaged with first teeth 205 and the second teeth 517, respectively. As a result, the angle between the pivot member 40 and the column member 20 can be adjusted to the desired angle, that is to say, it is possible to movably pivot the pivot member 40. At the same time, the sleeve member 50 can be pivoted to adjust the angle of the handlebar 60 to the optimal condition with respective to the pivot member 40. Finally, the bolt 419 is tightened, and the adjustment of the angle is thus completed.

In accordance with the foregoing description, the adjustment of the angle between the column member 20 and the pivot member 40, and the angle of the handlebar 60 can be easily and conveniently achieved by merely operating the bolt 419.

While there is shown and described herein certain specific structures embodying the present invention, it will be apparent to those skilled in the art that various modification and rearrangements of the parts may be made without departing from the spirit and scope of the underlying inventive concept.

What is claimed is:

1. An improved stem for a bicycle, said stem being adapted for fixing a handlebar, comprising:

a pivot member having a lateral member and a locking member attached to the underside of the lateral member, wherein the pivot member has two free ends each having a pivot portion and the locking member has two free ends as well;

a column member having a first connecting mechanism at the top thereof for pivotally connecting to the pivot portion; and a sleeve member securing the handlebar, and being provided with a second connecting mechanism at the free end thereof for pivotally connecting the other pivot portion of the pivot member, whereby the locking member can be operated to move so that each free end thereof is fixedly attached to or detached from the first connecting mechanism and the second connecting mechanism so as to achieve the adjustment of the angle between the column member and the pivot member, and the angle of the handlebar, at the same time.

2. An improved stem for a bicycle as claimed in claim 1, wherein the each pivot portion has a U-shaped slot defined by two walls each having a hole and a base wall.

3. An improved stem for a bicycle as claimed in claim 1, wherein the first connecting mechanism and the second connecting mechanism each comprise an arcuate area, an annular protruding member disposed at the center of the arcuate area, and a plurality of teeth on the surface thereof, the annular protruding member having a laterally central hole.

4. An improved stem for a bicycle as claimed in claim 1, wherein said two free ends of the locking member each having an arcuate area which is provided with a plurality of teeth on the surface thereof, and a threaded bore at the center thereof.

5. An improved stem for a bicycle as claimed in claim 1, wherein the lateral member includes a through bore at the center thereof.

6. An improved stem for a bicycle as claimed in claim 1, wherein the locking member has a threaded bore at the center thereof, the lateral member includes a through bore at the center thereof and the pivot member further comprises a spring having a channel and a bolt which is passed through the through bore and the channel, and then screwed into the threaded bore.

7. An improved stem for a bicycle as claimed in claim 4, wherein the lateral member includes a through bore at the center thereof and the pivot member further comprises a spring having a channel and a bolt which is passed through the through bore and the channel, and then screwed into the threaded bore.

8. An improved stem for a bicycle as claimed in claim 5, wherein the locking member has a threaded bore at the center thereof and the pivot member further comprises a spring having a channel and a bolt which is passed through the through bore and the channel, and then screwed into the threaded bore.

* * * * *